Patented May 27, 1952

2,598,496

UNITED STATES PATENT OFFICE 2,598,496

STABILIZATION OF VINYL HALIDE POLYMERS WITH A SALT OF A HYDROCARBON SUBSTITUTED BENZOIC ACID

Theodore F. Bradley and De Loss E. Winkler, Orinda, Calif., assignors to Shell Development Company, San Francisco, Calif., a corporation of Delaware No Drawing. Application January 21, 1950, Serial No. 139,966

16 Claims. (Cl. 260—45.75)

This invention relates to the stabilization of vinyl halide polymers against deterioration by heat and light, such stabilization being effected by incorporating in the polymer a bivalent metal salt of a hydrocarbon-substituted benzoic acid.

The term "vinyl halide polymer" is employed herein to designate the various resinous compositions obtained on the polymerization of a vinyl halide either with or without another copolymerizable compound. Thus, the term includes vinyl halide homopolymers such as polyvinyl chloride and polyvinyl bromide, for example, as well as copolymers such as those formed between a vinyl halide, e. g., vinyl chloride, and one or more of such components as vinyl acetate, vinyl propionate, vinyl butyrate, vinyl chloroacetate, ethyl methacrylate, benzyl acrylate, methyl chloroacrylate and/or vinylidene chloride.

Vinyl halide polymers, while extremely useful in a wide variety of industrial applications, suffer the disadvantage of being somewhat unstable with continued exposure to heat and/or light. As a result of such exposure, the polymers become discolored and otherwise experience a general degeneration in physical properties.

The present invention is based on the discovery that the stability of vinyl halide polymers against deterioration on exposure to heat and/or light is greatly increased by incorporating therein, either during the manufacture of the polymer or subsequently thereto, a minor percentage of a bivalent metal salt of a benzoic acid which is substituted by one or more hydrocarbon radicals in any of the positions of its phenyl nucleus other than the 1-position occupied by the carboxyl group. The aliphatic and cycloaliphatic radicals constitute a preferred group of hydrocarbon substituents, representative radicals of this character being, for example, alkyl radicals such as methyl, ethyl, propyl, butyl, pentyl, isopropyl, isobutyl, isopentyl, octyl, nonyl, octadecyl, lauryl, palmyl and stearyl; cycloalkyl radicals such as cyclopentyl, cyclohexyl, and methylcyclohexyl; alkenyl radicals such as vinyl, allyl methallyl, propenyl, butenyl, butadienyl and pentadienyl; and cycloalkenyl radicals such as cyclopentenyl, cyclohexenyl, cyclopentadienyl, methylcyclohexenyl and cyclohexadienyl.

The metal portion of the salt may be selected from a wide group of bivalent metals, by which term is meant those metals having a minimum valency of two such as barium, strontium, calcium, magnesium, beryllium, zinc, nickel, lead, tin or the like. However, a preferred group of metals for use in the present invention is that made up of barium, strontium, cadmium and tin.

Illustrative examples of substituted benzoic acid salts which effectively stabilize vinyl halide resins against deterioration by heat and/or light are:

Barium toluate
Strontium p-butylbenzoate
Strontium p-allylbenzoate
Stannous 2-methyl-4-isopropylbenzoate
Stannous 2,4-dimethylbenzoate
Cadmium 2,4-dimethylbenzoate
Cadmium p-isopropylbenzoate
Cadmium p-cyclohexylbenzoate
Strontium p-allylbenzoate
Strontium p-cyclohexylbenzoate
Nickel 2-methyl-4-allylbenzoate
Beryllium p-phenylbenzoate
Barium p-methylallylbenzoate
Magnesium p-butadien-1,3-ylbenzoate
Calcium toluate
Barium 2-ethyl-4-oleylbenzoate A particularly effective group of benzoic acid salts for the purposes of the present invention is made up of those wherein the metal is selected from the group consisting of barium, strontium, cadmium and tin and wherein the phenyl nucleus of the acid is substituted by an aliphatic radical containing not less than 4 carbon atoms, one of which is a quaternary carbon atom linked directly to a carbon atom of said nucleus. Representative radicals of the variety are, for example, the tertiary-butyl, tertiary-amyl, 1,1-dimethylpropen-2-yl, dodecyl (derived from propylene tetramer), 1 - methyl - 1 - ethylhexyl, 1-methyl-1-ethylhexen-5-yl, 1,1-dimethylbuten-2-yl and 1-methylcyclohexyl radicals. In this group of salts the remaining substituents attached to the carbon atoms of the phenyl nucleus, other than the carboxyl group, are selected from the group consisting of hydrogen atoms, alkyl, and cycloalkyl radicals, as methyl, ethyl, isobutyl, n-pentyl, n-heptyl, cyclohexyl, cyclopentyl, and the like. Representative compounds coming within this preferred class of salts, all of which exert an excellent stabilizing action on vinyl halide polymers, are: barium o-, m-, and p-tertiary-butylbenzoate, barium p-1,1-dimethylbuten-3-ylbenzoate, strontium o- and p-tertiary-butylbenzoate, cadmium p-tertiary-butylbenzoate, stannous p-tertiary-butylbenzoate, strontium o-, m- and p-tertiary-amylbenzoate, barium p-tertiary - amylbenzoate, cadmium p - tertiary-amylbenzoate, stannous p-tertiary-amylbenzoate, barium o-, m- and p-dodecylbenzoate, cadmium p-dodecylbenzoate, strontium p-dodecylbenzoate, stannous p-dodecylbenzoate, strontium 2-methyl-4-tertiary-butylbenzoate, barium 3-methyl-4-(1,1-dimethylpropen-2-yl)-benzoate, barium 2-isopropyl-3-tertiary-amylbenzoate, strontium p-(1-methyl-1-ethylheptadecyl)-benzoate, and the like.

All of the above-identified hydrocarbon-substituted benzoic acid salts can be prepared by any of the methods commonly employed in the synthesis of compounds of the same general class. Thus, the various barium, strontium, cadmium and stannous salts of p-tertiary-butylbenzoic acid may be prepared by first alkylating toluene with isobutylene, oxidizing the resulting product to p-tertiary-butylbenzoic acid, forming the sodium salt of the acid, and then treating the latter, in aqueous solution, with a water-soluble salt of the desired metal (e. g., BaCl$_2$) thereby causing the desired salt, here barium p-tertiary-butylbenzoate, to separate out. Again, the dodecylbenzoate salts, for example, may be prepared in like manner, but with the toluene being alkylated by propylene tetramer instead of with isobutylene.

The stabilizer salts of the present invention may be incorporated in the vinyl halide resin in any desired manner whereby intimate mixing of the materials is obtained. Thus, the stabilizer may be added to the vinyl halide monomer, or mixture of monomers, before the same is polymerized, though preferably the salt is added to the already polymerized material, as by dry-mixing in a masticator or on differential rolls heated to a temperature of from about 135 to 150° C. Alternatively, the salt can be added in the form of a solution in the plasticizer normally employed with the polymer, or in acetone or other appropriate solvent. In this connection, it may be stated that the stabilizer salts disclosed herein are soluble in or compatible with the various plasticizers, stabilizers, fillers, waxes, color pigments and other compounding ingredients employed in the manufacture of vinyl halide polymers, and the aforesaid salts may be used in conjunction with any one or more of the additives, as desired.

The amount of stabilizer salt which is added to the vinyl halide polymer can be varied within relatively wide limits, and good results are obtained by adding a total of from about 0.5 to 10% of one or more of such salts, based on the weight of vinyl halide polymer present.

The following examples illustrate the invention in various of its embodiments.

*Example I*

The vinyl halide resin composition of this operation was prepared by milling together 100 parts of a copolymer made up of 95% vinyl chloride and 5% vinyl acetate, 50 parts of dioctyl phthalate plasticizer and 2 parts of a stabilizer for 15 minutes, using roll temperatures of 130° C. and 150° C. The sheets obtained in this milling operation were then molded at 160° C. for 2 minutes. A "control" sheet was prepared in the same manner, but without the addition of any stabilizer compound. Various stabilizers were employed, among them two commercial products made up of cadmium naphthenate and strontium naphthenate, respectively. All of the sheets so obtained measured about 0.075 inch in thickness, were transparent and substantially colorless. The stability of the sheets against discoloration on being heated and/or exposed to ultra-violet light was then determined and the results expressed in the following table:

| Stabilizer Compound | Heating in Air | | Heating in Absence of Air 30 Min. at 170°C. | Exposure to Ultra-violet Light, 170 hrs. |
|---|---|---|---|---|
| | 1 hr. at 160°C. | 1 wk. at 100°C. | | |
| None | light amber | light amber | light amber | dark amber. |
| barium p-tert-butyl-benzoate | no change | pale straw color | no change | light amber. |
| barium p-dodecyl-benzoate | light amber | do | light amber | Do. |
| barium p-meth-allyl-benzoate | light amber [1] | do | light amber [1] | no change [1]. |
| strontium naphthenate | light amber | dark amber | light amber | light amber. |
| cadmium naphthenate | black | black | dark amber | dark amber. |

[1] These sheets were all somewhat translucent in appearance.

*Example II*

This operation was conducted using polyvinyl chloride-acetate sheets prepared in the same manner as described in Example I above. These sheets were exposed to ultra-violet light for 170 hours at approximately 65° C. in a humid atmosphere. The "control" turned a dark amber color as a result of such exposure, while the sheets stabilized with the commercial material cadmium naphthenate turned an even darker color and exhibited numerous heavy brown spots. On the other hand, those sheets stabilized with strontium p-tertiary-butylbenzoate and stannous p-dodecylbenzoate acquired but light straw and amber colorations, respectively, while those stabilized with cadmium p-tertiary-butylbenzoate and stannous p-tertiary-butylbenzoate remained clear and free of any color, though having a few small light amber spots. Similarly, the sheet stabilized with cadmium p-dodecylbenzoate also remained clear, though exhibiting somewhat larger amber spots.

*Example III*

The sheets employed in this operation were prepared in the manner described in Example I, but from polyvinyl chloride. Here the "control" sheet, when exposed to ultra-violet light for 170 hours in a humid atmosphere at 65° C. developed a straw color, while that stabilized with the commercial compound strontium naphthenate turned black. On the other hand, the sheet stabilized with barium p-tertiary-butyl-benzoate was unaffected by the exposure to ultra-violet light and retained its clear, transparent appearance.

*Example IV*

The operation of Example III is repeated, but using quantities of 0.5, 1.0, and 10% of barium p-tertiary-butylbenzoate in preparing the respective sheets tested instead of 2%, as employed in the foregoing example. While the sheet with but 0.5% of the barium salt acquires a somewhat yellowish cast as a result of this exposure, it is still noticeably lighter than the control. The sheets with 1% and 10%, respectively, of the barium salt are unaffected by the exposure conditions of this test. The percentages employed in this example are again based on the weight of polyvinyl chloride used in the plastic formulation.

We claim as our invention:

1. A process for stabilizing a vinyl halide polymer against deterioration on exposure to heat and light, said process comprising incorporating in said polymer a minor percentage of a bivalent metal salt of a hydrocarbon-substituted benzoic acid.

2. A process for stabilizing a vinyl halide polymer against deterioration on exposure to heat and light, said process comprising incorporating a said polymer from 0.5 to 10%, in terms of the weight of the polymer, of a bivalent metal salt of a benzoic acid having attached to the carbon atoms of its phenyl nucleus at least one radical selected from the group consisting of the aliphatic and cycloaliphatic hydrocarbon radicals.

3. A process for stabilizing a vinyl halide polymer against deterioration on exposure to heat and light, said process comprising incorporating in said polymer from 0.5 to 10%, in terms of the weight of the polymer, of a salt of a metal selected from the group consisting of barium, strontium, cadmium and tin with a benzoic acid substituted by an aliphatic radical having at least four carbon atoms, one of which is a quaternary carbon atom linked directly to the phenyl nucleus of the acid.

4. A process for stabilizing a vinyl halide polymer against deterioration on exposure to heat and light, said process comprising incorporating in said polymer from 0.5 to 10%, in terms of the weight of the polymer, of barium p-tertiary-butylbenzoate.

5. A process for stabilizing a vinyl halide polymer against deterioration on exposure to heat and light, said process comprising incorporating in said polymer from 0.5 to 10%, in terms of the weight of the polymer, of barium p-tertiary-amylbenzoate.

6. A process for stabilizing a vinyl halide polymer against deterioration on exposure to heat and light, said process comprising incorporating in said polymer from 0.5 to 10%, in the terms of the weight of the polymer, of barium p-dodecylbenzoate.

7. A process for stabilizing a vinyl halide polymer against deterioration on exposure to heat and light, said process comprising incorporating in said polymer from 0.5 to 10%, in terms of the weight of the polymer, of barium p-methallylbenzoate.

8. A process for stabilizing a vinyl halide polymer against deterioration on exposure to heat and light, said process comprising incorporating in said polymer from 0.5 to 10%, in terms of the weight of the polymer, of cadmium p-tertiary-butylbenzoate.

9. A heat and light-stabilized plastic composition containing a vinyl halide polymer and from 0.5 to 10%, in terms of the weight of the polymer, of a bivalent metal salt of a hydrocarbon-substituted benzoic acid.

10. A heat and light-stabilized plastic composition containing a vinyl halide polymer and from 0.5 to 10%, in terms of the weight of the polymer, of a bivalent metal salt of a benzoic acid having attached to the carbon atoms of its phenyl nucleus at least one radical selected from the group consisting of the aliphatic and cycloaliphatic hydrocarbon radicals.

11. A heat and light-stabilized plastic composition containing a vinyl halide polymer and from 0.5 to 10%, in terms of the weight of the polymer, of a salt of a metal selected from the group consisting of barium, strontium, cadmium and tin with a benzoic acid substituted by an aliphatic radical having at least four carbon atoms, one of which is a quaternary carbon atom linked directly to the phenyl nucleus of the acid.

12. A heat and light-stabilized plastic composition containing a vinyl halide polymer and from 0.5 to 10%, in terms of the weight of the polymer, of barium p-tertiary-butylbenzoate.

13. A heat and light-stabilized plastic composition containing a vinyl halide polymer and from 0.5 to 10%, in terms of the weight of the polymer, of barium p-tertiary-amylbenzoate.

14. A heat and light-stabilized plastic composition containing a vinyl halide polymer and from 0.5 to 10%, in terms of the weight of the polymer, of barium p-dodecylbenzoate.

15. A heat and light-stabilized plastic composition containing a vinyl halide polymer and from 0.5 to 10%, in terms of the weight of the polymer, of barium p-methallylbenzoate.

16. A heat and light-stabilized plastic composition containing a vinyl halide polymer and from 0.5 to 10%, in terms of the weight of the polymer, of cadmium p-tertiary-butylbenzoate.

THEODORE F. BRADLEY.
DE LOSS E. WINKLER.

REFERENCES CITED

The following references are of record in the file of this patent:

UNITED STATES PATENTS

| Number | Name | Date |
|---|---|---|
| 2,195,198 | Balle et al. | Mar. 26, 1940 |

FOREIGN PATENTS

| Number | Country | Date |
|---|---|---|
| 451,723 | Great Britain | Aug. 11, 1936 |